E. D. HOUGH & E. E. WILSON.
DRYING AND GRADING APPARATUS.
APPLICATION FILED JAN. 27, 1909.
937,213.
Patented Oct. 19, 1909.
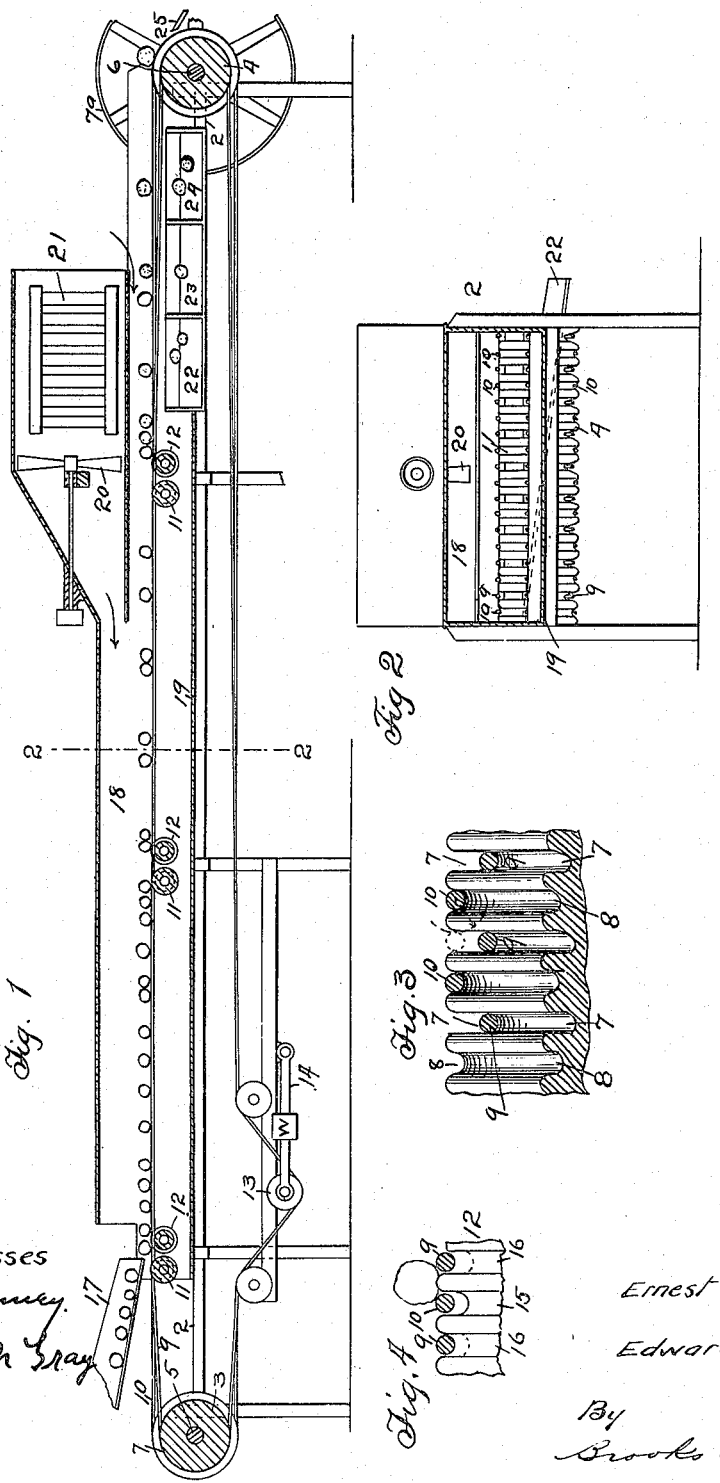

UNITED STATES PATENT OFFICE.

ERNEST D. HOUGH, OF LOS ANGELES, AND EDWARD E. WILSON, OF TUSTIN, CALIFORNIA.

DRYING AND GRADING APPARATUS.

937,213.  Specification of Letters Patent.  Patented Oct. 19, 1909.

Application filed January 27, 1909. Serial No. 474,603.

*To all whom it may concern:*

Be it known that we, ERNEST D. HOUGH and EDWARD E. WILSON, citizens of the United States of America, residing at Los Angeles, county of Los Angeles, State of California, and at Tustin, county of Orange, State of California, respectively, have invented a certain new and useful Improvement in Drying and Grading Apparatus; and we do hereby declare the following to be a full, clear, and exact description of the invention, such as will enable others skilled in the art to which it appertains to make and use the same.

This invention relates to an apparatus for drying and grading articles and more particularly for removing moisture from the surface of fruit or the like, and for separating the articles of differing sizes.

The invention has for its principal features the reduction to a minimum of the bruising and abrading of the fruit, the evaporation of moisture quickly therefrom, whereby the temperature of the fruit is reduced; and the combination in one apparatus, of means for doing the foregoing, with means for grading the fruit.

Other objects and advantages of the invention will be apparent upon consideration of the following description of one form of apparatus in which the invention may be embodied, reference being had to the accompanying drawing, in which—

Figure 1 is a longitudinal section through the apparatus; Fig. 2 is a section taken on line 2—2 of Fig. 1; Fig. 3 is a detail in elevation of one of the rollers forming part of the apparatus, and Fig. 4 is a detail of one of the idler rollers.

The frame 2 of the apparatus supports at each end drums 3 and 4, mounted on shafts 5 and 6. Shaft 6 has affixed thereto pulley 7ª. Drums 3 and 4 have therein alternate deep and shallow grooves 7 and 8 (Fig. 3). A plurality of ropes 9 and 10 pass over drums 3 and 4 and are supported by idlers 11 and 12 and tensionized by means of tension rollers 13 carried by links 14 pressed down by weights W. If desired but two ropes may be used, one for grooves 7 and another for grooves 8, said ropes passing over each set of grooves in succession, under the tensionizer, and then to the point of starting. Idlers 11 and 12 are preferably provided with alternate deep and shallow grooves 15 and 16 to keep ropes 9 and 10 in alinement, the shallow grooves of idlers 11 being in alinement with the deep grooves of idlers 12, and vice versa. This allows each idler to accommodate its rate of revolution to the travel of the set of ropes it is supporting and thus avoids wear on the ropes and waste of power. A chute 17 is positioned to deposit fruit at the front end of the apparatus, at or near the point where the first set of idlers is located. Back of this point there is provided a casing 18 having therein a bottom 19. A fan 20 draws air past a heater 21 and delivers it within casing 18. A set of inclined chutes 22, 23 and 24 is located beneath ropes 9 and 10 at the rear of the last set of idlers, and a chute 25 is placed at the rear of drum 4.

The mode of operation of the apparatus is as follows: Motion being communicated to pulley 7ª and to fan 20 from any source of power (not shown), fruit is delivered to chute 17, down which it travels on to ropes 9 and 10, which carry it toward the rear of the machine. Ropes 10 being in shallow grooves 8, travel faster than ropes 9, and consequently carry the side of the fruit resting upon them faster than the other side. This causes the fruit to be continuously turned and a fresh surface to be presented to the air from fan 20. After passing the point where the air from the fan enters the casing 18, the fruit meets a current of cool air which is induced by the action of the air from the fan. Upon leaving the last idlers, the ropes begin to separate, ropes 9 descending to pass over the deep grooves in drum 4 while ropes 10 continue in a straight line to grooves 8. As the distance between the ropes increases, the fruit is allowed to fall into chutes 22, 23 and 24, the smallest into 22 and the largest into 24. All that is too large to pass between the ropes is carried over drum 4 and deposited upon chute 25. It is to be understood that the use of heater 21 is optional, depending upon atmospheric conditions.

While one form of apparatus in which the invention may be embodied has been illustrated and described, it is obvious that various modifications and changes may be made, and the right is reserved to all such as do not depart from the spirit and scope of the invention.

We claim:

1. In a drying apparatus, in combination, a casing means to produce a current of air in said casing and means to carry articles through said current, said last mentioned means serving also to continuously turn said articles to present different sides to said air, substantially as described.

2. In a fruit drying apparatus, in combination, a casing, means to produce a current of air in said casing, a plurality of moving ropes in substantially parallel alinement and a plurality of alternate intervening ropes moving at a speed different from that of said first mentioned ropes to convey and turn fruit exposed to said current of air.

3. In a fruit drying apparatus, in combination, a casing, means to produce a current of air in said casing, a plurality of ropes arranged in substantially parallel alinement within the casing to convey fruit, and means to give alternate ropes a differing velocity to turn the fruit.

4. In a drying apparatus, in combination, a plurality of moving lines of rope, a portion of each of said lines moving parallel to each other to convey fruit and a portion of said lines moving in a non-parallel direction to grade fruit.

5. In a fruit drying and grading apparatus, in combination, a casing, means to produce a current of air in said casing, lines of rope moving in substantially the same plane within the casing and in a diverging direction with respect to each other at the rear of the casing, some of said ropes moving at a differing rate from the remaining ropes, and the means employed to produce said directions and rates of movement.

6. In a drying apparatus, in combination, a plurality of lines of ropes, drums over which said ropes pass, and alternate deep and shallow grooves in said drums.

7. In a drying apparatus, in combination, a plurality of lines of ropes, drums over which said ropes pass, alternate deep and shallow grooves in said drums, and idlers supporting a portion of said ropes in horizontal alinement.

8. In a drying apparatus, lines of rope and a plurality of idlers having grooves supporting alternate ropes and a plurality of cut away portions to clear the remaining ropes.

9. In a drying apparatus, lines of rope, drums having alternate deep and shallow grooves over which said ropes pass, idlers having alternate deep and shallow grooves whereby said idlers support only ropes traveling at a common speed, a casing, and means to cause a current of air to pass therethrough.

In testimony whereof, we have signed our names to this specification in the presence of two subscribing witnesses at Santa Ana, county of Orange, State of California, this 14 day of January, A. D. 1909.

ERNEST D. HOUGH.
EDWARD E. WILSON.

Witnesses:
H. J. FORGY,
H. H. MOYE.